(12) United States Patent
Skinner

(10) Patent No.: US 7,363,254 B2
(45) Date of Patent: *Apr. 22, 2008

(54) AUTOMATED WEB RANKING BID MANAGEMENT ACCOUNT SYSTEM

(76) Inventor: Christopher J. Skinner, 7928 Oak St., New Orleans, LA (US) 70118

( * ) Notice: Subject to any disclaimer, the term of this patent is extended or adjusted under 35 U.S.C. 154(b) by 1052 days.

This patent is subject to a terminal disclaimer.

(21) Appl. No.: 10/622,459

(22) Filed: Jul. 21, 2003

(65) Prior Publication Data

US 2004/0107137 A1 Jun. 3, 2004

Related U.S. Application Data

(63) Continuation-in-part of application No. 10/307,314, filed on Dec. 2, 2002, now Pat. No. 7,295,996.

(60) Provisional application No. 60/336,741, filed on Nov. 30, 2001.

(51) Int. Cl.
*G06Q 30/00* (2006.01)

(52) U.S. Cl. .............................. 705/26; 705/10; 705/14; 707/3

(58) Field of Classification Search ................ 705/1, 705/26, 28, 10, 14; 707/3
See application file for complete search history.

(56) References Cited

U.S. PATENT DOCUMENTS

| 6,078,866 | A | 6/2000 | Buck et al. |
| 6,269,361 | B1 | 7/2001 | Davis et al. |
| 6,477,509 | B1* | 11/2002 | Hammons et al. ............ 705/27 |
| 2001/0051911 | A1 | 12/2001 | Marks et al. |
| 2001/0051940 | A1* | 12/2001 | Soulanille ...................... 707/3 |
| 2002/0072999 | A1* | 6/2002 | Andres et al. ................ 705/28 |
| 2002/0147708 | A1* | 10/2002 | Thomas et al. ................ 707/3 |
| 2003/0028529 | A1* | 2/2003 | Cheung et al. ................ 707/3 |

* cited by examiner

Primary Examiner—F. Zeender
Assistant Examiner—Vanel Frenel
(74) Attorney, Agent, or Firm—Richard C. Litman

(57) ABSTRACT

The present invention relates to an automated web ranking system. The system monitors online marketing media ("OMM"), such as search engines, portals, affiliate programs, and other websites displaying advertiser listings or banner advertisements to determine the effectiveness of an online marketing campaign. The system is able to track online and telephonic orders or sales to a particular marketing campaign. Based on the effectiveness of a particular marketing campaign, the system can automatically place bids for positioning of an advertiser's listing on a pay-per-click search engine or make a determination as to whether or not to turn on a banner advertisement at set cost.

19 Claims, 6 Drawing Sheets

AUTOMATED WEB RANKING BID MANAGEMENT ACCOUNT SYSTEM

CROSS-REFERENCE TO RELATED APPLICATION

This application is a continuation-in-part of application Ser. No. 10/307,314, filed Dec. 2, 2002 now U.S. Pat. No. 7,295,996, which claims the benefit of U.S. Provisional Patent Application Ser. No. 60/336,741, filed Nov. 30, 2001.

BACKGROUND OF THE INVENTION

1. Field of the Invention

The present invention relates to software for evaluating and controlling an online advertising campaign, and more particularly to an automated web ranking bid management system for subscriber control of the advertising bidding process associated therewith.

2. Description of the Related Art

Web sites providing search services have offered advertisers significant reach into the Internet audience and have given advertisers the opportunity to target consumer interests based on keyword or topical search requests. In a web-based search on an Internet search engine, a user enters a search term comprising one or more keywords, which the search engine then uses to generate a listing of web pages in real time that the user may access via a hyperlink. While some search engines rely upon algorithms that select and organize the listing of web pages based on multiple criteria, such as keyword density and keyword location, others allow advertisers themselves to influence their placement in search result listings so that their listings are prominent in searches that are relevant to the content of their website. These search engines, referred to as pay-per-click search engines, require advertisers to pay for each click-through referral generated through the search result lists from the search engine. Thus, advertisers have an incentive to select and bid on those search keywords that are most relevant to their web site offerings. The higher an advertiser's position on a search result list, the higher likelihood of a referral.

Advertisers may also choose banner advertising to promote and increase their web exposure. In the banner advertising model, advertisers purchase space on the pages of popular commercial web sites. The advertisers usually fill this space with a colorful graphic, known as a banner, advertising their own web site. The banner may act as a hyperlink that a visitor may click on to access the site. Banner advertising on the Internet is typically priced on an impression basis, with advertisers paying for any exposure of the banner ad to potential customers, i.e., each time the web page with the banner is viewed. While banners may be displayed at every page access, on search engines they may be targeted to search terms. Banner advertising may also be sold on a fixed fee basis.

Online advertising may also be done through simple links on another site's web page, whether a search engine or not, and through affiliate programs in which the advertiser pays the host featuring the advertiser's link either a click-through rate or a commission based upon sales resulting from a click-through from the host's page.

Pay-per-click search engines, portals, or any web site that is paid to display a listing, referred to herein as Online Marketing Media ("OMM"), typically report back data on the effect of that advertising. Most OMM's have a monitoring interface, such as a URL Position Manager™, which allows an advertiser to constantly monitor, update, and/or reposition a listing. However, advertisers typically make several bids per day on a large number of search terms. Consequently, monitoring a particular listing to determine when and where advertising is effective and which search terms are producing the most results can become burdensome. In addition, manually raising and lowering bids generally takes a substantial amount of time, and the positioning resulting from these bids is not guaranteed for any period. Furthermore, with manual manipulation of bids, bid gaps are difficult to recognize and control. A bid gap occurs when advertisers are bidding more than they must for a certain position or search result ranking. In these cases, advertisers often pay more per click than is necessary to maintain optimal ranking or premium placement in the directory search engines. The result is that many sites do not draw nearly the amount of traffic that they could with continually optimized bid positioning management. Therefore, an automated bid monitor becomes essential. Some Web-based tools profess to help the advertiser protect their ranking and positioning problems through bid monitoring and bid management. These bid monitors help identify bid gaps, but do nothing to automatically correct bid gaps or to determine if and when search terms are effective in directing Internet traffic to an advertiser's web site. Consequently human attention and input is required.

Prior patents relating to Internet advertising do not disclose an automated bid monitoring system. Exemplary patents include U.S. Patent Publication No. 2001/0051911, published Dec. 13, 2001 (a bidding method used to prioritize advertising and search result listings delivered to users of the Internet); U.S. Patent Publication No. 2001/0051940, published Dec. 13, 2001 (a system for influencing a position on a search result list generated by a computer network search engine in which a predetermined number of search listings are selected according to bid amount for display to the searcher); U.S. Pat. No. 6,078,866, issued Jun. 20, 2000 to Buck et al. (an Internet site searching and listing service based on monetary ranking of site listings); U.S. Pat. No. 6,269,361, issued Jul. 31, 2001 to Davis et al. (a system and method for influencing a position on a search result list through a continuous online bidding process).

None of the above inventions and patents, taken either singly or in combination, is seen to describe the instant invention as claimed. Thus an automated web ranking bid management account system solving the aforementioned problems is desired.

SUMMARY OF THE INVENTION

The present invention relates to an automated web ranking system. The system monitors online marketing media ("OMM"), such as search engines, portals, affiliate programs, and other websites displaying listings or banner advertisements to determine the effectiveness of an online marketing campaign. If search terms are used to market an advertiser's product or services, the system determines the search term's effectiveness by collecting and analyzing data relating to the number of impressions, the number of clicks, and the number of resulting sales generated by a search term at a given time period. By assigning a keycode to a user when the user initially enters a search term, the system is able to track an online order or sale to a particular marketing campaign.

The present invention also provides for tracking a telephonic order or purchase to a particular marketing campaign by incorporating a content management system within the advertiser's web site. The tracking keycode which is assigned to an Internet user triggers the content management system to display a telephone number per web site or per web page which is unique to that keycode. The system can thereby track each telephone call made to a telephone number displayed on the advertiser's web site or web page to a particular keycode, and consequently to a particular marketing campaign.

Based on the data collected and the parameters which the advertiser provides relating to the advertiser's economic factors, the system calculates a maximum acceptable bid for each keycode. The system monitors the web for competitor's bids on an advertiser's search term and places bids which fall below the maximum acceptable bid. The system automatically reduces or eliminates bid gaps which would otherwise occur when an advertiser bids more than they must for a certain positioning.

The system also monitors the effectiveness of online marketing that is not linked to search terms, such as banner advertising that is displayed at every page access. A keycode is assigned to the user upon accessing the OMM that is paid to display the banner advertisement. The system collects and analyzes data relating to the number of impressions, the number of clicks, and the number of resulting sales per unit time generated by the search engine or website which displays the banner advertising.

Accordingly, it is an object of the present invention to provide a method for automatically controlling a subscriber's URL Position Management™ accounts.

It is a further object of the invention to provide advertisers with a means for setting maximum bid amounts and desired ranking for the search terms on which they bid while optimizing the bids to the indicated or desired positions, or as near to them as possible, while staying under the maximum bid amount desired for each term.

Still a further object of the invention is to provide a means for maintaining a bid schedule set by the advertiser, including real time updating.

It is a further object of the present invention to automatically seek out "bid gaps" in an advertiser's account and to automatically lower them to a preset level slightly above the nearest competitive bid during prescribed time periods of a day, a month or a year.

Yet another object of the invention is to allow a subscriber to receive the same amount of clicks or traffic as the higher bidder, at a significant cost savings.

Another advantage of the present invention is to allow a subscriber to effectively control their advertising budget based upon effectiveness of a search term to generate Internet traffic to an advertiser's web site.

Still another object of the present invention is to allow the advertiser to monitor the bids and bidding behavior of the advertiser's competitors and adjust bids and times of bidding based upon the observed bidding behavior of the advertiser's competitors.

Yet another object of the present invention is to allow a subscriber advertiser to automatically and continually monitor and change bids in its pay-per-click search engine account based upon preset parameters established by the subscriber advertiser, with such parameters including maximum bid amount, dynamic bid schedule, as well as competitor bid behavior.

Still another object of the present invention is to provide a means of preventing overbidding for key words in pay-per-click accounts.

Another object of the present invention is to provide an ability to market a business based upon sales conversion rates and cost of customer acquisition within given time intervals by real time strategy implementation, using historic data, bid updating and bid adjustment.

It is yet another object of the present invention to provide the subscriber advertiser with an ability to track competitor behavior, providing a historic data base which can be used by the subscriber advertiser to adjust strategy, either by outbidding or underbidding competitors as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
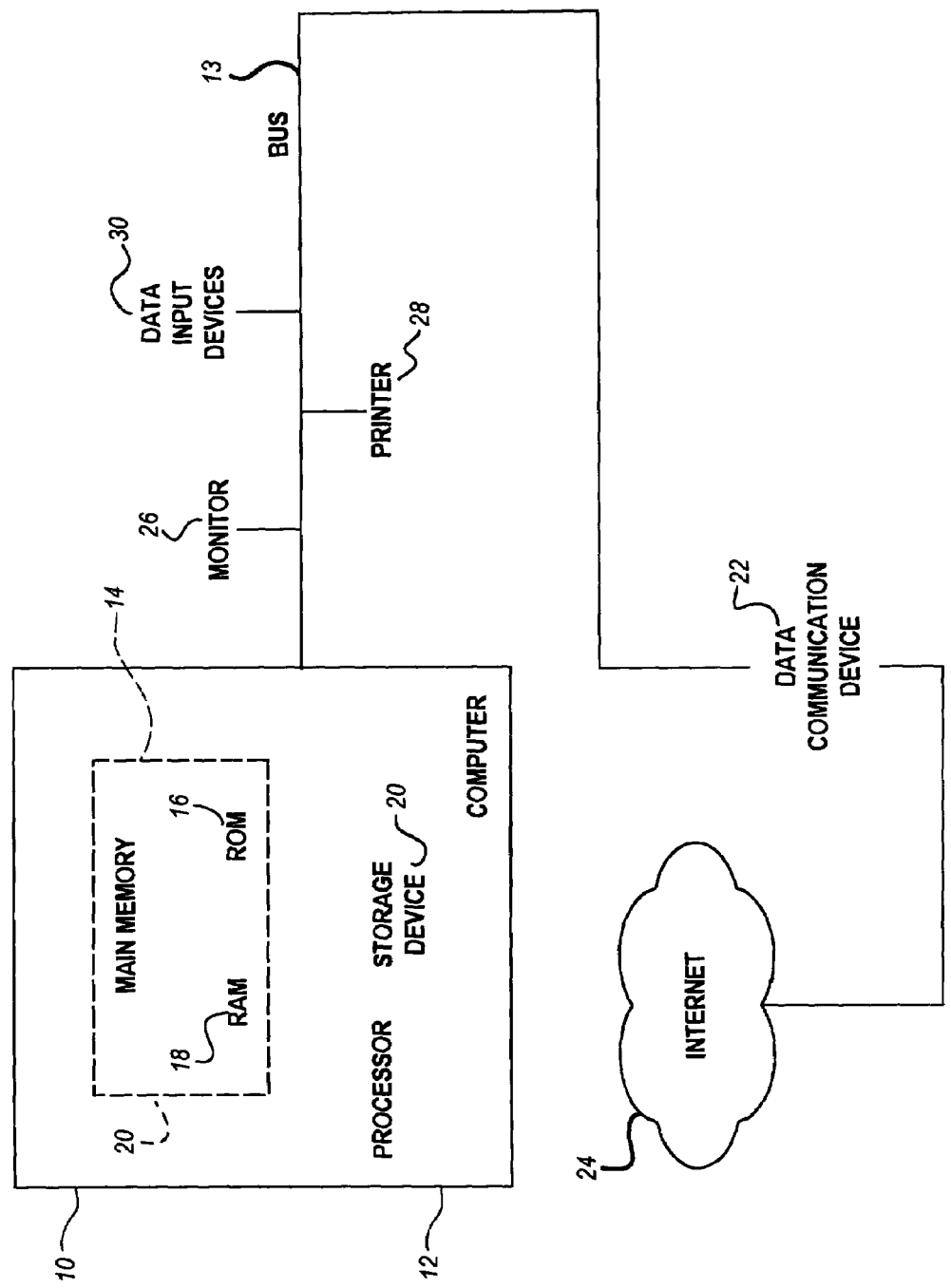
FIG. 1 is a block diagram of a typical personal computer system for carrying out the present invention.

The present invention relates to a web-based computer system for maximizing the effectiveness of advertising through banner ads, click-through search engines, links, affiliate programs and other advertising media. The system is designed to operate on one or more computers. While mainframes or minicomputers may be used, the system performs quite adequately using personal computer systems. While the details of the computer system may vary and still be within the scope of the claimed invention, FIG. 1 shows a typical personal computer system for carrying out the present invention.

The personal computer system is a conventional system which includes a personal computer 10 having a microprocessor 12 (viz., an Intel Pentium III), including a central processing unit (CPU), a sequencer, and an arithmetic logic unit (ALU), connected by a bus 13 or buses to an area of main memory 14 for executing program code under the direction of the microprocessor 12, main memory including read only memory (ROM) 16 and random access memory (RAM) 18. The personal computer 10 also has a storage device 20 and a data communications device 22, such as a modem or other means for connecting to a network 24, such as a modem, Ethernet, ISDN, DSL, or other devices for connecting to a network 24, and particularly to the Internet, either directly or through an Ethernet or LAN, preferably using a high speed connection, such as T3, ISDN, or DSL.

The personal computer system also comprises peripheral devices, such as a display monitor 26, a printer 28, and one or more data input devices 30 such as a keyboard or mouse.

It will be understood that the term storage device refers to a device or means for storing and retrieving data or program code on any computer readable medium, and includes a hard disk drive, a floppy drive or floppy disk, a compact disk drive or compact disk, a digital video disk (DVD) drive or DVD disk, a ZIP drive or ZIP disk, magnetic tape and any other magnetic medium, punch cards, paper tape, memory chips, or any other medium from which a computer can read stored data.

The client personal computer 10 will be equipped with a web browser, such as Netscape Navigator, Microsoft's Internet Explorer, or other browser software executing in main memory, while server computers will be equipped with web server software capable of delivering web pages in hypertext markup language (HTML) to client computers using hypertext transfer protocol (HTTP).

The automated web ranking system includes a web-based software program. The web-based program code executes in the main memory 20 under the direction of the microprocessor 12, and includes Web server software which enables the system to maintain a database of search terms relating to an advertiser's service or product; track Internet user activity generated to an OMM and an advertiser's website when an Internet user conducting a web-based search on the OMM enters at least one search term relating to a service or product of the advertiser; track Internet user activity generated to an OMM and an advertiser's website when an Internet user views the advertiser's banner advertisement on the OMM or accesses the advertiser's website by clicking on the banner advertisement displayed on an OMM; vary content displayed on an advertiser's website based on keycode; acquire data relating to the Internet user activity; sort the acquired data to remove duplicate information; compile a master data set from said data wherein data values are arranged according to time of Internet user activity and a designated primary key; determine sufficiency of data based on specified conditions; calculate an acceptable new maximum bid for the search term; determine whether said maximum bid is a justified expense for the advertiser in light of profit determining factors; determine whether to maintain, modify, or remove a bid for a search term; retrieve information on competitor's bids; identify desired ranking; prepare an insertion order with an appropriate bid for achieving the desired ranking; and automatically upload the insertion order to an OMM.

The system can determine and maximize the effectiveness of advertising through banner ads, click-through search engines, links, affiliate programs and other advertising media. For online advertising that is associated with search terms, the program maintains a database of search terms, which it uses to market an advertiser's product or services through an OMM. The effectiveness of using a particular search term, banner advertisement or other online marketing tool is determined by collecting and analyzing data relating to the number of impressions, the number of clicks, and the number of resulting sales generated by the search term, banner advertisement, or other online marketing tool at a given time period. The system is particularly designed to analyze data per time period as the number of impressions (number of times the web page bearing the advertising is viewed), the number of clicks (and particularly a click-through, i.e., where the user clicks on the link and does not terminate the process until the advertiser's page is reached), and the number of resulting sales at differing times of day, month, or year.

Figure 2:
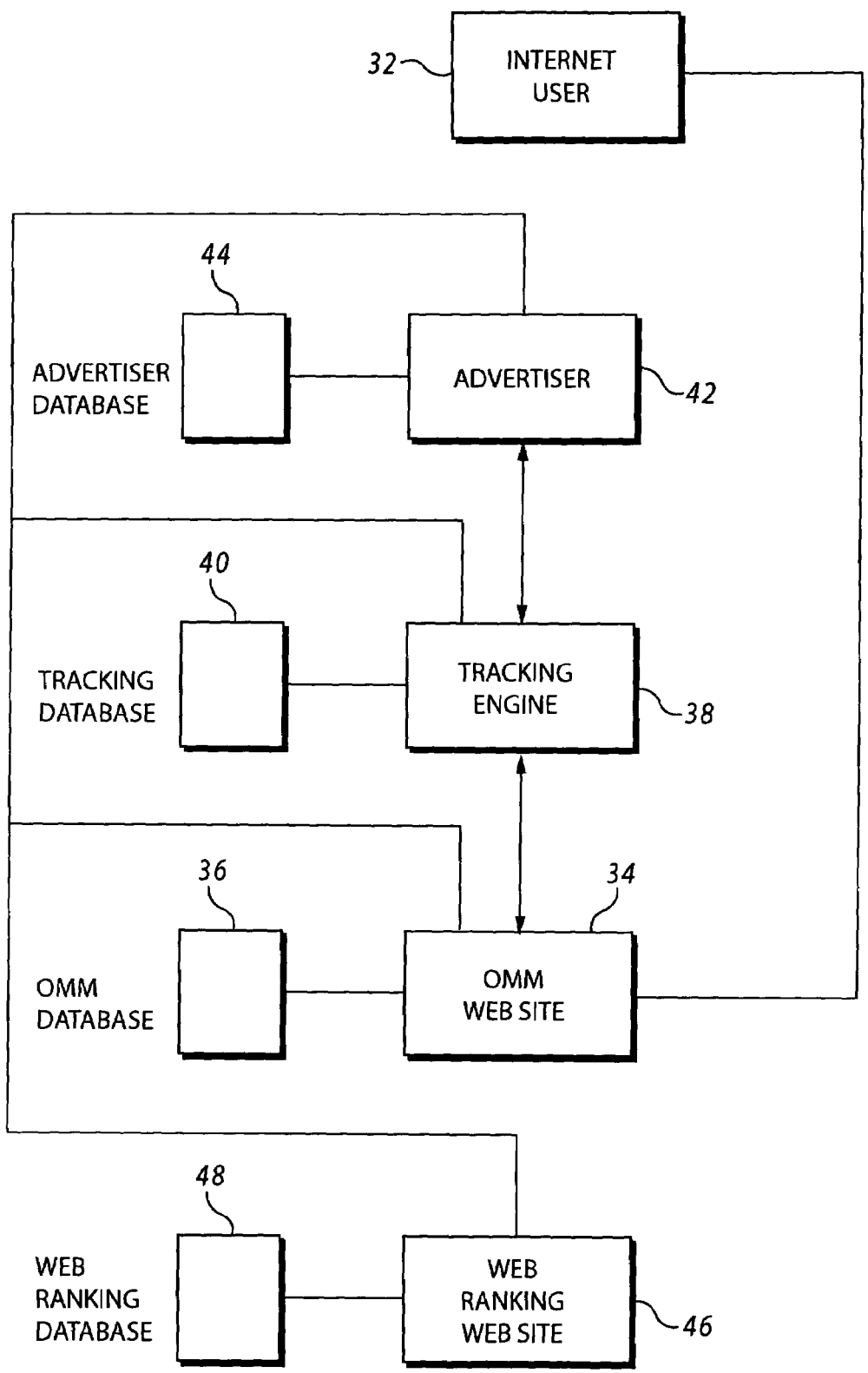
FIG. 2 is a block diagram showing the interaction of web sites and other entities in the automated web ranking bid management account system according to the present invention.

Data Collection: The data is collected as shown in FIG. 2. When an Internet user 32 logs onto an OMM 34, such as a pay-per-click search engine, and enters one of the advertiser's designated search terms, the resulting display of listings will include the advertiser's listing. This display of the advertiser's listing, referred to as an impression, as well as the time and date of its occurrence will be recorded in the OMM database 36. Alternatively, the Internet user 32 may log onto a different type of OMM 34 such as a website that is paid to display an advertiser's banner advertisement. The display of the advertiser's banner advertisement when the Internet user 32 accesses the paid website, also referred to as an impression, and the time and date of its occurrence are also recorded in the OMM database 36.

If the user 32 then proceeds to click on the advertiser's listing or banner advertisement the time and date of the click as well as the cost of the click, if any, to the advertiser will also be recorded in the OMM database 36. The user 32 will then be directed to a tracking engine 38. The tracking engine 38 may be provided by the client advertiser's website 42 or by a third party. The tracking engine 38. identifies the user's browser by any suitable means known in the art, including but not limited to, setting a cookie on browsers that do not have cookies intentionally disabled, or setting a session I.D. The tracking engine 38 then records this information in a tracking engine database 40. The tracking engine 38 also records within its database 40 the time and date at which the user 32 clicked upon the client advertiser's listing or banner ad, and which OMM 34 the user 32 was directed from. As is known in the art, the tracking engine also provides the user 32 with a tracking URL with which to access the client advertiser's website. The tracking URL has embedded within it a keycode to help identify the OMM website 34 which was used to direct the user 32 to the advertiser's web site 42, the search term which was used at the OMM website 34, and/or other information relating to the activity of the user 32 on the OMM website 34 or advertiser's website 42. The tracking engine 38 will then redirect the user 32 to the advertiser's website 42 at the indicated URL.

Once the user has accessed the advertiser's website 42, additional information is recorded in the advertiser's database 44, such as time and date of visit, as well as keycode information. If a user 32 takes an action on the advertiser's website 42 during the initial visit or any subsequent visit, such as completing a form or purchasing a product or service, an additional record is added to the advertiser's database 44 containing the time and date of the action and the amount of purchase if a purchase was made, or the name of the item requested if a form was completed. If the user 32 takes an action on the advertiser's website 44, a confirmation page containing a 1×1 pixel transparent GIF image is also sent to the tracking engine 38 so that the tracking engine 38 may match up this information with the user's session I.D. and cookie information which was previously recorded in the database. The confirmation page provides the tracking engine 38 with information that was recorded for the user 32 in the advertiser's database 44. In this manner, the action of the user 32 may be tracked to the search term and OMM 34 that was initially used to refer the user to the advertiser's web site 42.

Some consumers may prefer not to order merchandise by online forms, but will call a telephone number posted on the website 42 to order merchandise by telephone. Therefore, in order to determine the effectiveness of the online advertising, the advertiser's website 42 is also configured to track orders or purchases made by telephone by employing a content management system. As is generally known in the art, a content management system can be used to vary content displayed on a given web site based upon information provided by the user or gathered by the website. In the present invention, the content management system may display a unique telephone number per web site or web page, so that the telephone number may be used as the keycode in lieu of a tracking URL, or may be uniquely associated with the tracking URL. The keycode can also trigger the display of multiple telephone numbers on different pages throughout a web site. The displayed telephone numbers can be unique per page without limit. Since each telephone number corresponds with a unique keycode, telephonic orders or purchases may be tracked to a particular keycode, and therefore to a particular marketing campaign.

Conventional call center software is employed to record the time and date of a phone call and the telephone number that was called. This information is forwarded to the advertiser's database 44. The name of the user 32 and any additional information relating to the telephone call that may be acquired by the person answering the telephone call is also entered into the advertiser's database 44. In the event that the, telephone call results in a sale, the associated data may be entered into the advertiser's database manually or automatically by the content management software by linking the order information to the keycode, i.e., the unique telephone number.

The content management system may also be used to vary the display of other information on an advertiser's web site, such as street address or email address, in a similar manner.

The system collects data from the OMM database 36, the tracking engine database 40, and the advertiser's database 44 once the OMM 34 begins to receive impression data. The frequency of the data collection can vary and may depend on how frequently data becomes available at the OMM database 36.

Figure 3:
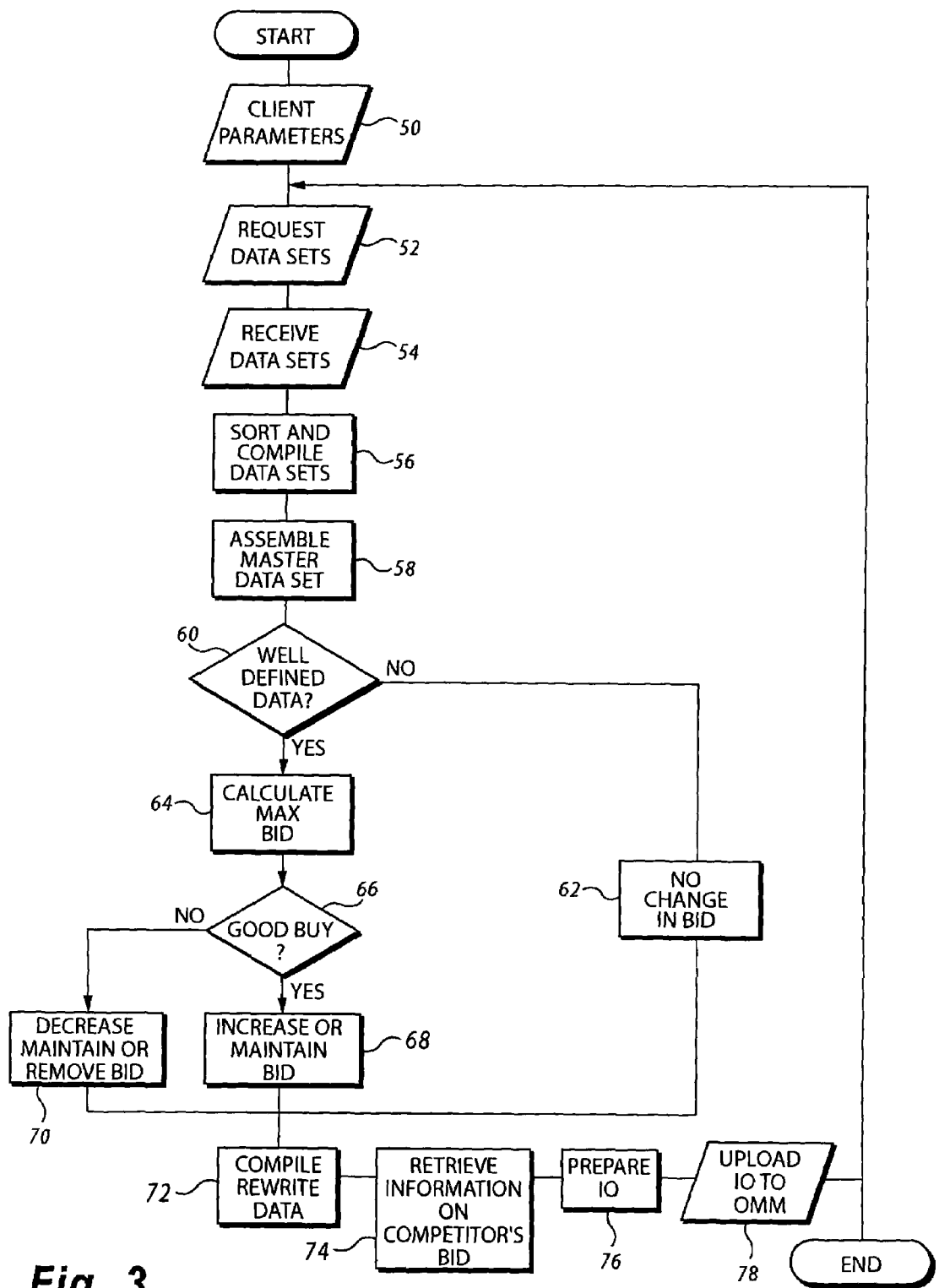
FIG. 3 is a flowchart depicting how insertion orders are prepared in the system according to the present invention.

Optimizing Insertion Orders: The system enables advertisers to maximize their return on advertising spent (ROAS). ROAS is typically dependent on an advertiser's profits from selling a particular service or item. Referring to FIG. 3, initially, it is necessary for an advertiser to provide the system with some preliminary parameters 50 which reveal economic factors particular to an advertiser, such as an initial ROAS value which the advertiser determines must be targeted for, a monetary budget within which the system may work, and reasonable estimate of the expected clicks or actions by a user for a given time period. The system requests data 52 from the OMM, the tracking engine, and the advertiser's website as soon as possible after impression data is created in the OMM database. The system then receives data sets 54 from the databases. Once the data is received, the system sorts and compiles the data sets 56. The data is sorted by a primary key and according to time periods in which an event or impression took place. All duplicate information is discarded during the sorting process. The primary key is preferably the designated keycode.

Once the data is sorted, a master data set is compiled 58. The system then conducts an analysis to identify well defined datasets 60 per keycode. Well defined data includes a dataset wherein the number of actions recorded for a specified time period exceed a minimum threshold value, because only those keycodes which lead to an acceptable number of user actions can yield accurate data regarding the effectiveness of a particular marketing campaign. If the data is not well defined, then the bid is not changed 62. If the data is considered to be well defined, the system must calculate a new acceptable maximum bid 64. This can be done by first calculating a new ROAS value, which is the amount of sales divided by the cost to advertise per keycode per unit of time. Then the following formula is used:

$$\text{New ROAS/Goal ROAS} * \text{current Max bid} = \text{New Max Bid.}$$

The goal ROAS value is a value which the advertiser initially provided and the current maximum bid is either designated by the advertiser or by the system if a similar analysis has already taken place for a different time period, as will be discussed later.

The system then determines whether or not the keycode can be deemed a good buy 66, or specifically whether or not the newly calculated maximum bid is a justified expense for the advertiser in light of profit determining factors which will be discussed in FIGS. 4-6. If the keycode is considered a good buy, the bid is either increased, maintained, or decreased 68. However, if the keycode is linked to a banner advertisement at set cost(not shown in figure), a determination is made to keep the banner advertisement on. If the keycode is not a good buy, the bid is either maintained, decreased, or removed 70. However, if the keycode is linked to a banner advertisement at set cost (not shown in figure) a determination is made to turn the banner advertisement off. This information is then compiled 72 by the system.

The system then logs into the advertiser's OMM account to determine competitor's bid amounts 74. The system can obtain competitor bid information, including the ranking, URL, and cost per click of the competitor, directly from the OMM if the OMM displays such information, otherwise competitor bid information and/or ranking can be obtained thru screen scraping. Screen scraping refers to a process known in the art, wherein data is retrieved via a software designed for the purpose of removing data from web sites. Once the system has access to information regarding competitor bids, the system locates the highest ranking competitor having a bid that is less than the newly calculated max bid. The system then prepares an insertion order 76 which reflects a bid that is a minimal value, such as one cent above that competitor's bid for a particular search term for a particular time period. The insertion order is then uploaded to the OMM 78. If the competitor then proceeds to outbid the system by one cent to regain its ranking, the system will prepare an insertion order bidding one cent above that bid and this process will continue until the newly calculated max bid value is reached. At this time the system will drop its bid to the original bid value.

In an alternative embodiment, where competitor bid information is not available, the system may obtain the desired ranking by submitting a bid to the OMM which falls below the newly calculated max bid. The system will note the ranking obtained and will continuously rewrite the insertion order to reflect varying bids until the desired ranking is achieved.

Analyzing Data Sets: While there are many ways to determine whether or not a keycode represents a good buy, a few examples are delineated in FIGS. 4-6. A discussion of some terms and concepts used in the system's analysis of keycode data sets and which are necessary for understanding FIGS. 4-6 follows.

Many variables are used in the figures to represent changing values of parameters. These variables are defined below:

R1 is a value determined by the advertiser as an acceptable minimum for ROAS;

R2 is a value determined to be an ideal or acceptable maximum for ROAS in light of profits made on a particular product or service and in light of required costs for advertising and other expenditures. If R2 is set too high, for example, what remains may be insufficient to cover advertising costs.

α is a minimum threshold value of actions taken by Internet users;

X is a minimum acceptable number of visits;

Ac is the number of Internet user visits in a given data set;

π is some maximum acceptable number of visits which can be expected during a given time period. If the keycode is newly introduced to the system, π is generally given a value of three visits per hour, or some acceptable maximum number of visits which can be expected during a given time period. If the dataset related to a keycode has been analyzed before, π represents the highest number of sales or actions per keycode per time period;

C is an expected value of visits that would result in at least some actions taken by the Internet user. For example, if conversion rate is 2% for 100 visits, then C must be 50;

S is a minimal number of clicks which are likely to result in no actions;

Y is an ideal or an acceptable maximum number of visits.

If a keycode is being analyzed by the system for the first time, the minimum and maximum acceptable values for visits and actions, as well as the range of acceptable ROAS values are typically provided by the advertiser based on economic factors particular to the advertiser. These values can also be based on competitor data or the value can simply be estimated. After the system gathers sufficient data for that keycode, these estimated values can be adjusted accordingly. For example, once the system has acquired sufficient data, it can determine the conversion rate per keycode i.e. the ratio of user actions to user visits per time and adjust the initial values accordingly. Thus, a site that has a conversion rate of 1% will require a higher number of user visits to yield the desired ROAS than a site that converts at 10%. Similarly, a site that has a conversion rate of 10% and a standard deviation of +/−5% will require less visits than the site that converts at 10%.

On some occasions when a search term does not yield favorable data, the term is still maintained in light of its computational linguistics value. A term is given computational linguistics value if it is a brand term or is reflective of advertiser name or if the advertiser's website offers a one of a kind product or service and little or no competition exists.

Premium placement is considered to be a particular ranking on a search result listing which delivers a high volume of traffic to the advertiser's web site, such as ranking in the first page of search result listings or the top three listings.

Figure 4:
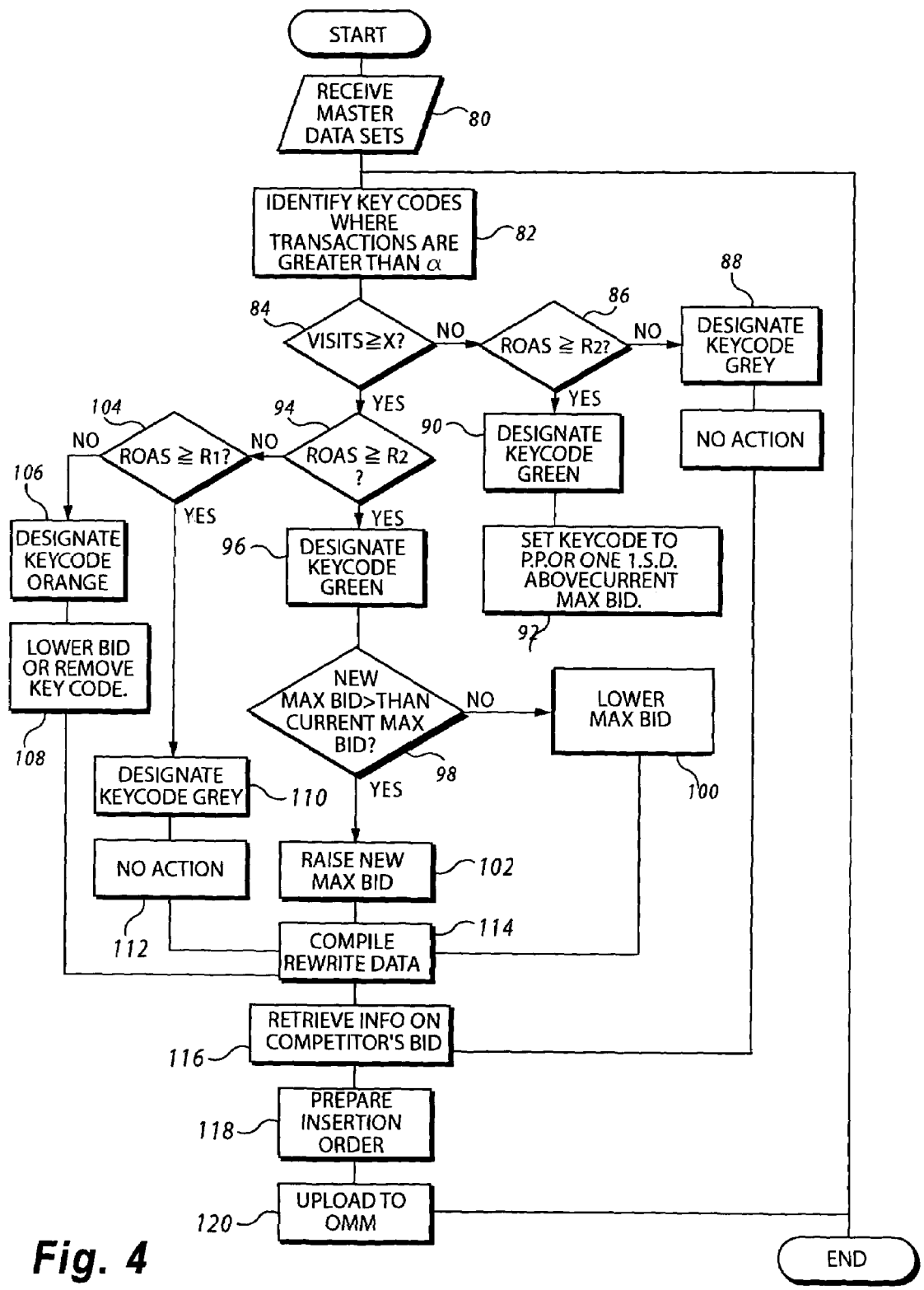
FIG. 4. is a flowchart exemplifying how a data set is analyzed under a first set of parameters according to the present invention.

As previously mentioned and reflected again in FIG. 4, once a master dataset is compiled, the system must identify keycodes having well-defined data, i.e. datasets where the number of actions which occur at the advertiser's website are greater than α 82. The system then determines whether the number of visits to a website are greater than or equal to X 84. If the number of visits to a website are below X, the system then determines whether or not the ROAS is greater than or equal to R2 86. If the number of visits to a website is below X and ROAS is greater than or equal to R2 86, the keycode is designated green 90 and the search term is set to premium placement or one S.D. (standard deviation) above the current max bid 92. If the number of visits to a website are below X 84 and less than R2 86, the keycode is designated grey 88 and no action is taken.

If the number of visits is greater than or equal to X 84, and ROAS is determined to be greater than or equal to R2 94, the keycode is designated green 96. If the new calculated max bid is greater than the current max bid 98, the max bid is raised 102, if it is not, the max bid is lowered 100 if the keycode has low computational linguistics value and premium placement would not be lost.

If the number of visits is greater than or equal to X 84, and ROAS is less than R2 94 and greater than or equal to R1 104, then the keycode is coded grey 110 and no action is taken 112. If the number of visits is greater than or equal to X 84 and ROAS is less than R2 94 and lower than R1 104, the keycode is designated orange 106. If the orange coded keycode has premium placement, then it is lowered to non-premium placement. If the keycode does not have premium placement, the bid is lowered to the OMM's minimum bid requirements if it has some computational linguistics value, otherwise it is removed 108. The system then compiles all keycode designations requiring a bid change 114. Information on competitor's bids is retrieved 116 as previously discussed and an insertion order is prepared 118. The insertion order is then uploaded to the OMM 120.

Figure 5:
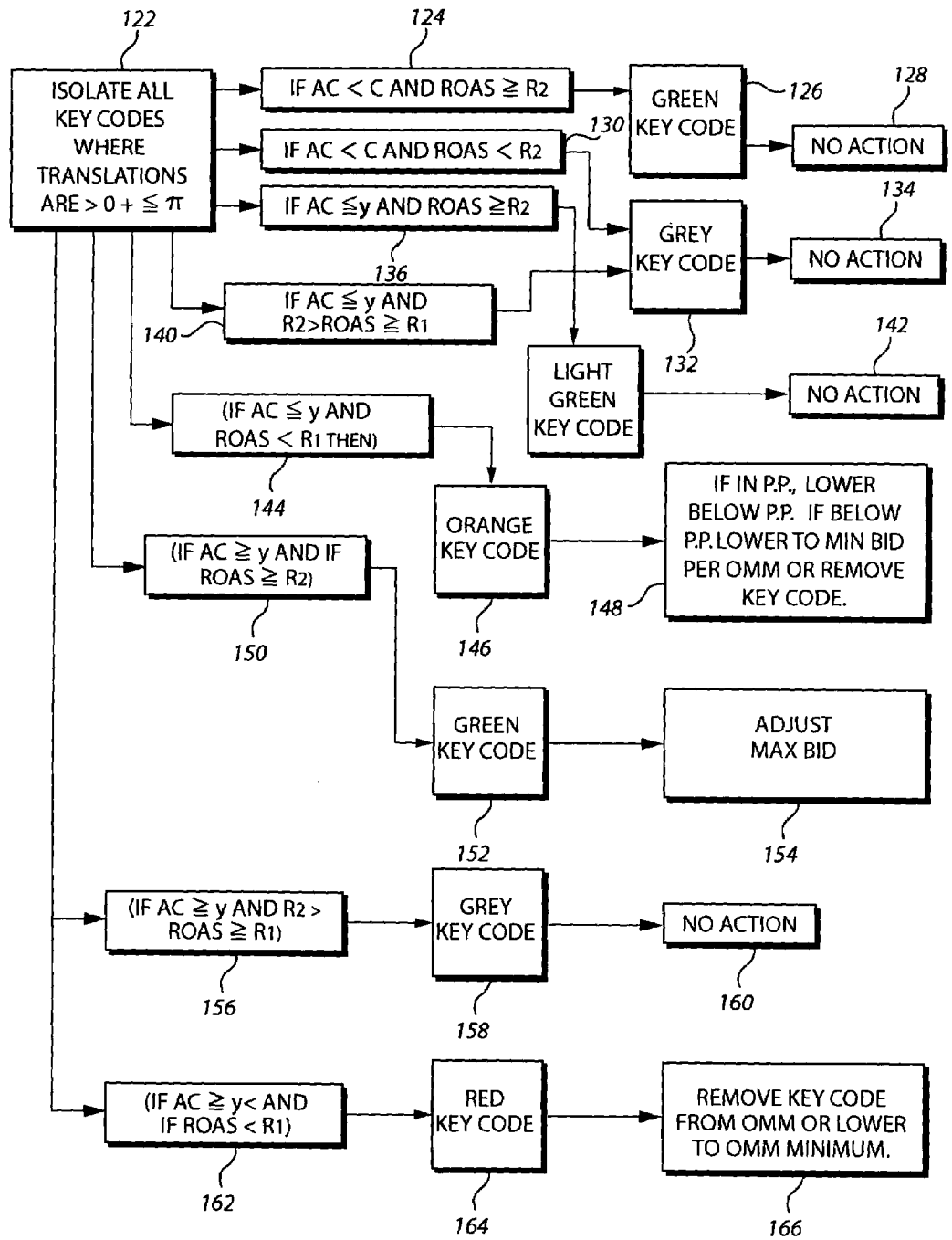
FIG. 5 is a flowchart exemplifying how a data set is analyzed under a second set of parameters according to the present invention.

FIG. 5 depicts how the system may analyze alternative data set possibilities to determine whether or not a bid needs to be modified. The first step depicted in FIG. 5 is to isolate all keycodes where transactions are greater than 0 and less than or equal to a value designated as π 122. If the number of visits is less than C and the ROAS is greater than or equal to R2 124, the keycode is designated green 126 and no action takes place 128. If the number of visits is less than C and ROAS is less than R2 130 the keycode is designated grey 132 and again no action takes place 134. If the number of visits is less than or equal to Y and ROAS is greater than or equal to R2 136, the keycode is designated light green 138 and no action takes place 142. If the number of visits is less than or equal to Y and ROAS is less than R2 and greater than or equal to R1 140, the keycode is designated grey and no action takes place 132. If the number of visits is less than or equal to Y and ROAS is less than R1 144, the keycode is designated orange 146 and if the search term has premium placement, the bid is lowered below premium placement 148. If the orange coded keycode is already ranked below premium placement, then the bid is lowered to the minimum bid acceptable by the OMM or the term is removed (after considering computational linguistic value of the term). If the number of visits is greater than or equal to Y and if ROAS is greater than or equal to R2 150, the keycode is designated green 152 and the max bid is adjusted after considering computational linguistic value and premium placement. If the number of visits is greater than or equal to Y and ROAS is greater than or equal to R1 but less than R2 156, then the keycode is designated grey 158 and no action takes place 160. If the number of visits is greater than or equal to Y and if ROAS is less than R1 162, the keycode is designated red 164 and the bid is removed from OMM or lowered to the minimum bid acceptable by the OMM 166.

Figure 6:
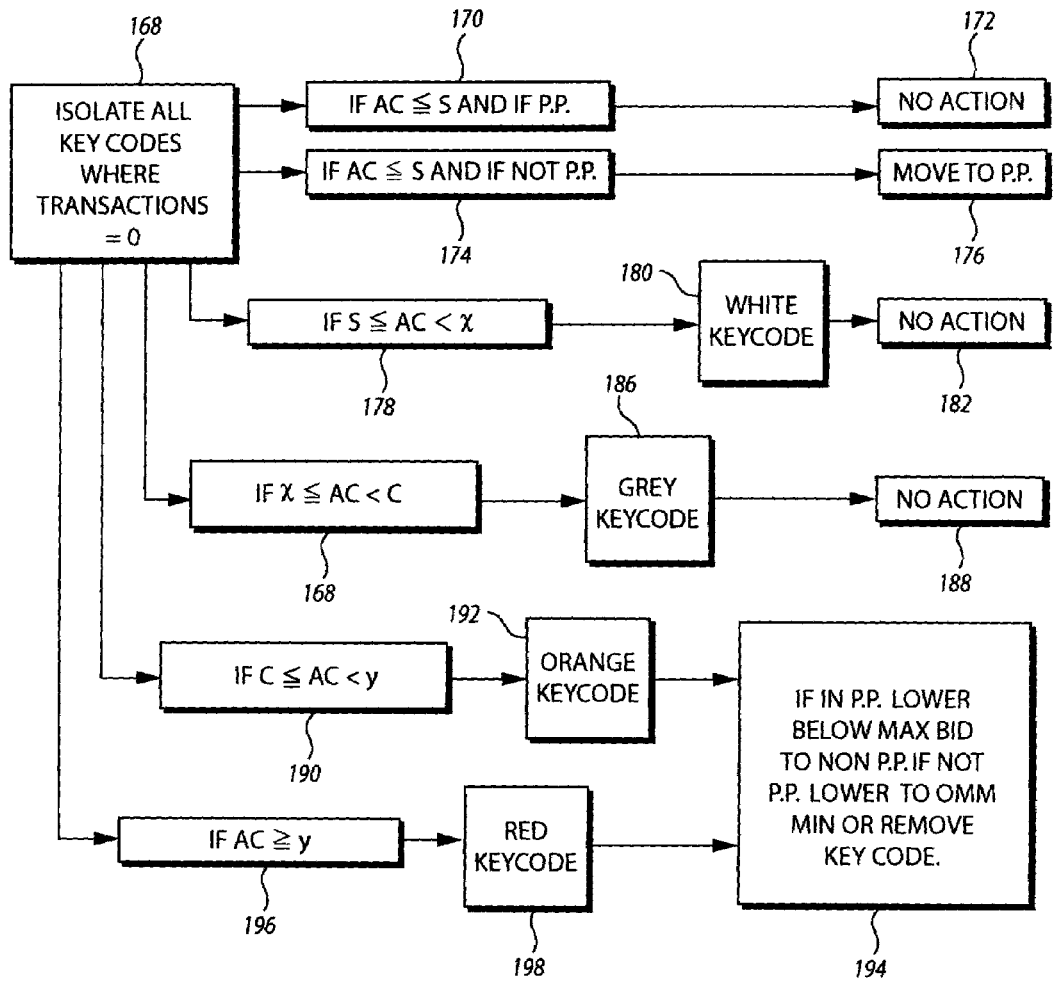
FIG. 6 is a flowchart exemplifying how a data set is analyzed under a third set of parameters according to the present invention.

FIG. 6 depicts how the system may analyze additional data set possibilities to determine whether or not a bid needs to be modified. The first step is to isolate all keycodes where the transactions are equal to 0 168. If the number of visits are greater than or equal to S and if the listing has premium placement 170, then no action takes place 172. If the number of visits is less than or equal to S and if the listing does not have premium placement 174, then the bid should be modified to place the listing at premium placement 176. If the number of visits are greater than or equal to S and less than X 178, the keycode is designated white 180 and no action takes place 182. If the number of visits is greater than or equal to X and less than C 184, the keycode is designated grey 186 and no action takes place 188. If the number of visits is greater than or equal to C and less than Y 190, the keycode is designated orange 192. If the listing is in premium placement, the bid should be lowered below the calculated max bid to non-premium placement 194. If the listing is not in premium placement, the bid should be lowered to the minimum bid acceptable by the OMM or the bid should be removed based on computational linguistic value of the search term 194. If the number of visits is greater than or equal to Y 196, the keycode should be designated red 198. If the listing is in premium placement, the bid should be lowered below the calculated max bid to non-premium placement 194. If the listing is not in premium placement, the bid should be lowered to the minimum bid acceptable by the OMM or the bid should be removed based on computational linguistic value of the search term 194.

It is to be understood that the present invention is not limited to the embodiments described above, but encompasses any and all embodiments within the scope of the following claims.

I claim:

1. An automated method for web ranking of bids, comprising the steps of:
    tracking Internet user activity generated to an Online Marketing Media (OMM) and an advertiser's website when an Internet user conducting a web-based search on the OMM enters at least one search term relating to a service or product of the advertiser;
    acquiring data relating to the Internet user activity;
    sorting said data to remove duplicate information;
    compiling a master data set from said data wherein data values are arranged according to time of Internet user activity and a designated primary key;
    determining sufficiency of data based on specified conditions;
    calculating an acceptable new maximum bid for said search term;
    determining whether said maximum bid is a justified expense for the advertiser in light of profit determining factors, said profit determining factors comprising an expected return on advertising spend (ROAS) value, a minimum acceptable return on advertising spend (ROAS) value, a maximum return on advertising spend (ROAS) value, a computational linguistics value of the search term, and the new maximum acceptable bid value;
    determining whether to maintain, modify, or remove a bid for a search term;
    retrieving information on competitor's bids; identifying desired ranking;
    preparing an insertion order with an appropriate bid for achieving the desired ranking; and
    automatically uploading the insertion order to the OMM.

2. The method of claim 1, wherein Internet user activity generated to an OMM and an advertiser's website is tracked by the OMM, the advertiser's website, and a tracking engine.

3. The method of claim 2, wherein said tracking engine tracks the Internet user's activity by assigning a tracking URL having a keycode embedded therein that identifies the OMM and a search term which was used by the Internet user to access the advertiser's listing.

4. The method of claim 3, wherein said primary key comprises the keycode used in the tracking URL.

5. The method according to claim 1, further comprising the steps of:
    providing the advertiser's web site with content management system software displaying a plurality of web pages containing unique advertisements, each advertisement having a unique telephone number published therein;
    assigning a keycode to each telephone call received at the telephone numbers published in the advertisements, the keycode identifying the telephone number uniquely associated with the advertisement;
    recording data regarding receipt of each said telephone call and purchase orders resulting therefrom in said master data set.

6. The method according to claim 5, wherein said recording step is performed automatically by call center software.

7. The method of claim 1, wherein said step of acquiring data relating to Internet user activity includes sending GET requests at specified time intervals to the OMM, the tracking engine, and the advertiser's web site.

8. The method of claim 1, further comprising maintaining a database of a plurality of search terms relating to the advertiser's service or product.

9. The method of claim 1, wherein the data set contains a designated threshold value of visits and actions taken by the user on the advertiser's website for fulfilling said specified conditions for data sufficiency.

10. The method of claim 1, wherein said step of identifying desired ranking includes identifying the highest competitor bid which falls below the new maximum acceptable bid value.

11. The method of claim 1, wherein the step of preparing insertion order with appropriate bid for achieving the desired ranking includes entering a bid that is a minimal value above the highest competitor bid which falls below the new maximum acceptable bid value.

12. An automated method for web ranking of bids, comprising the steps of:
    tracking Internet user activity generated to an Online Marketing Media(OMM) and an advertiser's website when an Internet user conducting a web-based search on the OMM enters at least one search term relating to a service or product of the advertiser;
    acquiring data relating to the Internet user activity;
    sorting said data to remove duplicate information;
    compiling a master data set from said data wherein data values are arranged according to time of Internet user activity and a designated primary key;
    determining sufficiency of data based on specified conditions;
    calculating an acceptable new maximum bid for said search term;
    determining whether said maximum bid is a justified expense for the advertiser in light of profit determining factors;
    determining whether to maintain, modify, or remove a bid for a search term;
    retrieving information on competitor's bids; identifying desired ranking;
    preparing an insertion order with an appropriate bid for achieving the desired ranking
    entering a bid that is a minimal value above the highest competitor bid which falls below the new maximum acceptable bid value; and
    automatically uploading the insertion order to the OMM.

13. The method of claim 12, wherein Internet user activity generated to an OMM and an advertiser's website is tracked by the OMM, the advertiser's website, and a tracking engine.

14. The method of claim 13, wherein said tracking engine tracks the Internet user's activity by assigning a tracking URL having a keycode embedded therein that identifies the OMM and a search term which was used by the Internet user to access the advertiser's listing.

15. The method of claim 14, wherein said primary key comprises the keycode used in the tracking URL.

16. The method according to claim 12, further comprising the steps of:

providing the advertiser's web site with content management system software displaying a plurality of web pages containing unique advertisements, each advertisement having a unique telephone number published therein;

assigning a keycode to each telephone call received at the telephone numbers published in the advertisements, the keycode identifying the telephone number uniquely associated with the advertisement;

recording data regarding receipt of each said telephone call and purchase orders resulting therefrom in said master data set.

17. The method according to claim 16, wherein said recording step is performed automatically by call center software.

18. The method of claim 12, wherein said step of acquiring data relating to Internet user activity includes sending GET requests at specified time intervals to the OMM, the tracking engine, and the advertiser's web site.

19. The method of claim 12, further comprising maintaining a database of a plurality of search terms relating to the advertiser's service or product.

* * * * *